(12) United States Patent
Serbinis et al.

(10) Patent No.: US 12,475,179 B2
(45) Date of Patent: Nov. 18, 2025

(54) SYSTEM AND METHOD FOR USER CONTENT PERSONALIZATION

(71) Applicant: League, Inc., Toronto (CA)

(72) Inventors: Michael Serbinis, Toronto (CA); Dan Galperin, Toronto (CA); Dan Leibu, Vancouver (CA); Mehrsasadat Golestaneh, Richmond Hill (CA); Kuhan Perampaladas, Toronto (CA); Mohammed Kobrosli, Toronto (CA)

(73) Assignee: League, Inc., Toronto (CA)

( * ) Notice: Subject to any disclaimer, the term of this patent is extended or adjusted under 35 U.S.C. 154(b) by 0 days.

(21) Appl. No.: 18/025,226

(22) PCT Filed: Sep. 8, 2021

(86) PCT No.: PCT/CA2021/051235
§ 371 (c)(1),
(2) Date: Mar. 8, 2023

(87) PCT Pub. No.: WO2022/051844
PCT Pub. Date: Mar. 17, 2022

(65) Prior Publication Data
US 2024/0028654 A1     Jan. 25, 2024

Related U.S. Application Data

(60) Provisional application No. 63/075,893, filed on Sep. 9, 2020.

(51) Int. Cl.
*G06F 16/9535*     (2019.01)
*G06F 16/334*     (2025.01)
*G06F 16/9538*     (2019.01)

(52) U.S. Cl.
CPC ...... *G06F 16/9535* (2019.01); *G06F 16/3347* (2019.01); *G06F 16/9538* (2019.01)

(58) Field of Classification Search
CPC ............ G06F 16/9535; G06F 16/3347; G06F 16/9538
See application file for complete search history.

(56) References Cited

U.S. PATENT DOCUMENTS

| 8,316,041 | B1 * | 11/2012 | Chang | ........... G06F 40/284 707/730 |
| 10,338,963 | B2 * | 7/2019 | Geigel | ........... G06F 9/5044 |

(Continued)

OTHER PUBLICATIONS

International Search Report (ISR) issued in respect of international (PCT) application No. PCT/CA2021/051235 on Nov. 29, 2021 (3 pages).

(Continued)

*Primary Examiner* — Albert M Phillips, III
*Assistant Examiner* — Fatima P Mina
(74) *Attorney, Agent, or Firm* — Eric D. Lavers (57) ABSTRACT

A computer-implemented method of selecting content items from a collection of content items in a content system. The method includes determining at least one characteristic of a user from a corresponding user profile and determining at least one previously selected content item selected from the collection of content items by the user from a user history. A first set of tags is generated comprising at least one tag associated with the at least one characteristic and at least one previously selected content item. The first set of tags is used as input to query an index of the collection of content items with which are associated a second set of tags that are semantically similar to the first set of tags. The result of the query is a list of content items for the user associated with the corresponding user profile.

18 Claims, 8 Drawing Sheets

(56) References Cited

U.S. PATENT DOCUMENTS

| | | | |
|---|---|---|---|
| 2002/0138456 A1* | 9/2002 | Levy | G06Q 10/10 |
| | | | 434/322 |
| 2010/0235313 A1* | 9/2010 | Rea | G06F 16/335 |
| | | | 706/54 |
| 2012/0054217 A1* | 3/2012 | Clarke | G06F 16/954 |
| | | | 707/769 |
| 2014/0280171 A1* | 9/2014 | Niles | G06F 40/237 |
| | | | 707/740 |
| 2018/0315060 A1* | 11/2018 | Sheppard | G06Q 30/0203 |
| 2019/0384469 A1* | 12/2019 | Lo | G06F 16/24578 |
| 2021/0042374 A1* | 2/2021 | Davis | G06F 16/24578 |
| 2021/0192126 A1* | 6/2021 | Gehrmann | G06N 20/00 |

OTHER PUBLICATIONS

Written Opinion (WO) issued in respect of international (PCT) application No. PCT/CA2021/051235 on Nov. 29, 2021 (6 pages).

* cited by examiner

SYSTEM AND METHOD FOR USER CONTENT PERSONALIZATION

REFERENCE TO RELATED APPLICATIONS

This application claims priority from U.S. Application No. 63/075,893 filed on Sep. 9, 2020 entitled SYSTEM AND METHOD FOR USER CONTENT PERSONALIZATION, the disclosure of which is hereby incorporated by reference in its entirety.

TECHNICAL FIELD

The present disclosure relates generally to digital content delivery, and, in particular, to a system and method for generating and presenting personalized health and wellness related content to a user of a device via a user application.

BACKGROUND

There is much attention and interest currently on a person's well-being and general state of health. In particular, there is a trend for employers focusing on their employees' health, benefits and healthcare literacy to optimize healthcare spending. Employers, benefit providers, and targeted health solutions providers (e.g., in the fields of mental health, sleep, diabetes, virtual care) are responding by creating a variety of programs to address demand for improved health and well-being. However, all of them struggle to reach and engage the end user of such programs, such as company employees. At the same time, usage data suggests that employees are underutilizing health benefits available to them through their employers and are not fully benefiting from available offerings. Employers' efforts to create awareness in this regard appear to be ineffective as the employers themselves may be unable to grasp the whole set of health programs and offerings available for their employees or be incapable of understanding which programs will be most impactful to their employees' health.

SUMMARY OF THE DISCLOSURE

In general, the present specification describes a system and method for generating personalized health and wellness content to a user based on a user profile that may be updated periodically to promote and encourage habits that result in improved health and wellness of the user.

According to a first broad aspect of the present invention there is provided a computer-implemented method of selecting content items from a collection of content items in a content delivery system, the method comprising: receiving a user profile associated with a user of the content delivery system, the user profile containing user information identifying at least one characteristic of the user; receiving a user history associated with the user, the user history identifying at least one previously selected content item selected from the collection of content items by the user; extracting a first set of tags from the user profile and the user history, the first set of tags containing at least one tag associated with the at least one characteristic of the user and the at least one previously selected content item selected by the user; and querying a content index of the collection of content items using the first set of tags as an input to generate a content list containing a selection of content items with which are associated a second set of tags that are semantically similar to the first set of tags, wherein the selection of content items is selected from the collection of content items; and each tag in the first set of tags and the second set of tags belong to a common taxonomy.

According to a second broad aspect of the present invention, there is provided a system for selecting content items from a collection of content items in a content delivery system, the system comprising: a data warehouse for storing the collection of content items and a content index of the collection of the content items; a communication interface for receiving a plurality of selection requests from a plurality of user client systems; and at least one processor operable to process a selection request of the plurality of selection requests to: receive, from the selection request, a user profile association a user of the content delivery system, the user profile containing user information identifying at least one characteristic of the user; receive, from the selection request, a user history associated with the user, the user history identifying at least one previously selected content item selected from the collection of content items by the user; extract a first set of tags from the user profile and the user history, the first set of tags containing at least one tag associated with the at least one characteristic of the user and the at least one previously selected content item selected by the user; and query the content index using the first set of tags as an input to generate a content list containing a selection of content items with which are associated a second set of tags that are semantically similar to the first set of tags, wherein the selection of content items is selected from the collection of content items; and each tag in the first set of tags and the second set of tags belong to a common taxonomy.

Additional aspects of embodiments of the present specification will be apparent in view of the description, which follows.

BRIEF DESCRIPTION OF THE DRAWINGS

Features and advantages of the embodiments of the present invention will become apparent from the following detailed description, taken with reference to the appended drawings in which.

DETAILED DESCRIPTION

The description which follows, and the embodiments described therein, are provided by way of illustration of examples of particular embodiments of the principles of the present invention. These examples are provided for the purposes of explanation, and not limitation, of those principles and of the invention.

The present disclosure is directed to providing systems and methods to enable dynamic generation of recommendations to an individual of available health programs, activities, services and other health-related content. The recommendations establish a personalized health program that would lead to an expected improvement of the individual's overall health and/or permit the individual to develop habits that would lead to an expected improvement of overall health and wellbeing.

The disclosed systems and methods may be useful, for example, in the context of an employer-provided health benefit regime in which various insurer-provided benefits, health programs, products, and services (collectively "health benefits") are available to an employee. The employee may be aware of some of the available health benefits and be unaware of other available health benefits. Therefore, the employee may wish to increase his or her awareness and utilization of relevant health benefits that may be useful to them. Concurrently, employers may wish to know how their health benefits are being utilized so as to enable the employer to optimize their health benefits spending accordingly (e.g. by increasing coverage in respect of one health benefit or decreasing/cancelling coverage for another health benefit, based on their use). The disclosed systems and methods are intended to be used to more effectively identify and recommend content to an employee to enable them to discover new and useful health benefits covered under the employee's plan that, when used, may lead to positive health outcomes. At the same time, the employer can use the herein disclosed system, for example, to track the level of engagement and usage to gain insight in respect of how they can optimize their healthcare benefits spending.

Content available to the user may include health programs that comprise one or a combination of activities and content delivered to the user in a structured manner to achieve a specific user goal targeting various areas such as general health, mental health, physical health, financial health, and family health. Examples of specific goals can include, but are not limited to, weight loss, increasing flexibility and strength, and eating nutritionally balanced meals. The target goal may be achieved by following the health program to learn and adopt new health behaviour or behaviours within a desired time frame and in a measurable way.

The health program can include a set of activities performed according to a sequence or schedule. One way to measure a user's progress through a given health program is to document/track the completion of the activities within the health program. Tracking can be accomplished by way of self-reporting or using telemetric devices such as smart watches and other wearable devices capable of measuring different activities and/or biological metrics (e.g. heart rate, sleep habits, blood pressure, etc.). An incentive can be offered to the user to encourage adherence to the health program and its completion. In one example, the user can be awarded points for completing an activity, and accumulated points can be redeemed for additional products and services in a health benefits marketplace ("marketplace items"). Marketplace items can include services provided by various health and wellness providers that may be outside a user's health benefits coverage. For example, marketplace items can include services for nutritional assessments, yoga classes, health and fitness equipment, and the like.

To optimize user engagement and the user experience, the disclosed systems and methods can incorporate a recommendation engine that is configured to suggest and expose health programs and/or marketplace items (generally "content items") that may appeal to the user. The type and nature of health programs or marketplace items selected for recommendation can be determined based on the user's previous participation, in some cases tracked with use of telemetric devices, as well as their health profile, as described in greater detail below.

Figure 1:
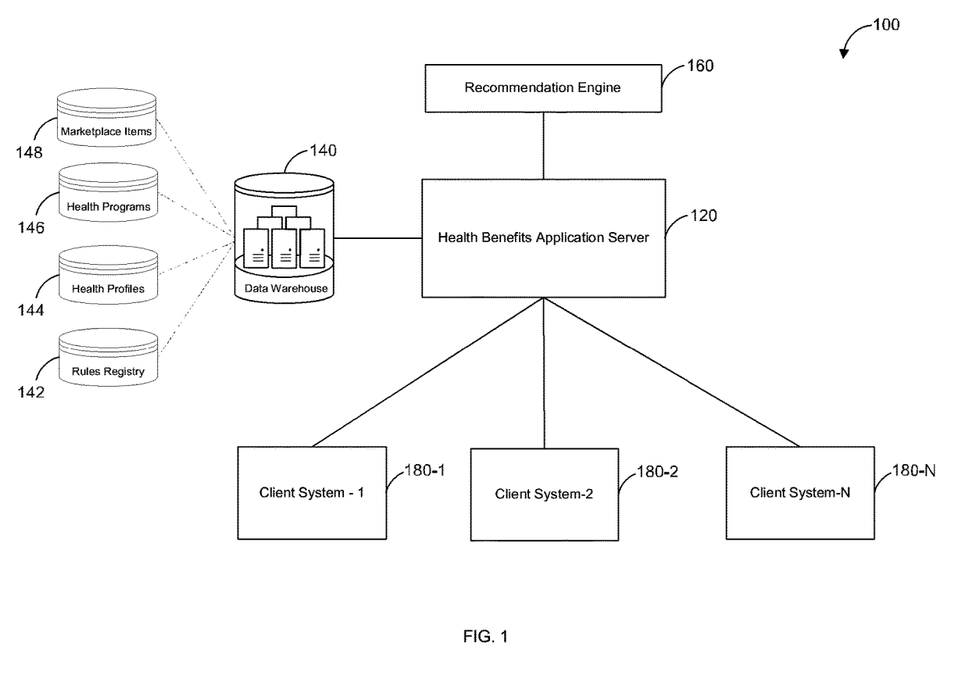
FIG. 1 is a diagram of a content recommendation system according to at least one embodiment of the present invention.

Referring first to FIG. 1, presented therein is a content recommendation system 100 or "system". For explanatory purposes, the system 100 is described in the context of an employer-provided benefits program for providing health program and marketplace item recommendations to program participants such as employees. In alternative embodiments, the system 100 may be configured to provide content recommendations for content other than health benefits. In the present implementation, the system 100 includes a health benefits application server 120, a data warehouse 140, and a recommendation engine 160. During operation, one or more client systems 180 may communicate with the health benefits application server 120 through a communication interface or layer of the health benefits application server 120 to allow a respective user to access services available under the benefits program. Depicted in FIG. 1 are N client systems, the first system denoted as client system-1 180-1, client system-2 180-2, and so on to client system-N 180-N.

In one implementation, the system 100 can be hosted on a local or on-premises computer system with hardware and software resources to facilitate local or remote access. The system 100 may alternately be hosted on a distributed or cloud-based environment located remotely at a data centre (e.g. Google™ Cloud Services, Amazon™ Web Service, or Microsoft™ Azure™ Cloud Computing Platform). A cloud-based system may provide scalability in respect of storage memory or computational requirements. As the number of available health benefits and/or users increase and become more complex (e.g. as more user data is collected by or provided to the system 100), a cloud-based system may be better equipped to allocate additional computing and/or storage resources to accommodate the need for additional computer resources.

The health benefits application server 120 (the "application server") provides a computing/software platform that is operable to coordinate the operation of the system 100 as well as managing the employer-provided health benefit regime and receiving input requests from client devices 180. The platform, as shown in FIG. 1, is implemented using a client-sever configuration in which the exchange of data between the components of the system 100 can be implemented using remote procedure calls and Application Programming Interface ("API")-level communication. Encryption such as SSL or other suitable security protocols may be implemented to secure communication and exchange of confidential and/or personal information.

The data warehouse 140 is a data storage system that can take the form of a memory, disk, or monolithic or distributed database configured to store user information and other information relevant to operate the system 100. The stored data may include, but not be limited to, one or more content items such as user-related data such as user health profiles (described in detail below), health benefits data, and operational data such as software and associated logic such as data tags, dictionaries, training data, and data models used to generate content recommendations. The health benefits data can include data describing health programs items available to users, marketplace items (e.g., purchasable goods and services), and other content of interest such as blogs, articles, videos, and the like.

The content items stored within the data warehouse 140 may be associated with a suitable identifier (an "ID"). For example, each health program stored within the data warehouse can be assigned a corresponding health program item ID. Similarly, each marketplace item may be assigned a corresponding marketplace item ID. The item ID may include information identifying an entity type. The entity type can be used to identify the nature of the content, for instance, whether it is a health program item, a marketplace item, or any other type of content item. The nature of the content may be used by the recommendation engine 160 to select a recommendation for a user, as described in more detail below.

In some embodiments, the data warehouse further includes a rules registry 142 that enables the application server 120 or recommendation engine 160 to apply sorting and filtering rules stored therein to control the manner in which recommended content may be displayed or accessed by users. In addition to storing data sets and other information relevant to content recommendation, the data warehouse 140 can also be configured to store payment data, insurance data, customer-relationship or support data, data from third-party partners or providers, and analytics data to help system managers or the employer to identify trends and usage habits of the users.

As the user engages with the system 100, the user's activities can be recorded to their corresponding health profile in a health profiles registry 144. The health profile can be updated over time to include usage and behavioural information such as the health benefits that were selected or browsed, as well as which marketplace items were purchased via a user application. The user data can also include information indicating the user's progress through a chosen health plan or health journey that comprises one or more health programs, which data are tracked through various methods such as self-reporting and via the use of wearable telemetric devices such as smart phones and smart watches.

In addition to the health profiles registry 144, corresponding registries may be provisioned within the data warehouse 140 for storing and maintaining a list of health programs and marketplace items. In some embodiments, the data warehouse 140 of the present system 100 is provisioned with a health programs registry 146 and a marketplace items registry 148.

One or more client systems 180 can connect to the application server 120 by way of the communication interface to allow users to access health benefits and other content. Each client system 180 can be a suitable computing device including, but not limited to, desktop computers, laptop computers, smart phones, smart watches, tablets, and any other similar devices. A suitable client software application (the "client app") can be executed on the client system 180 to enable the user to connect to the communication interface of the application server 120 to access available health benefits, submit input requests or queries, and to set up or update their health profiles, make health benefits claims, and the like.

Figure 2A:
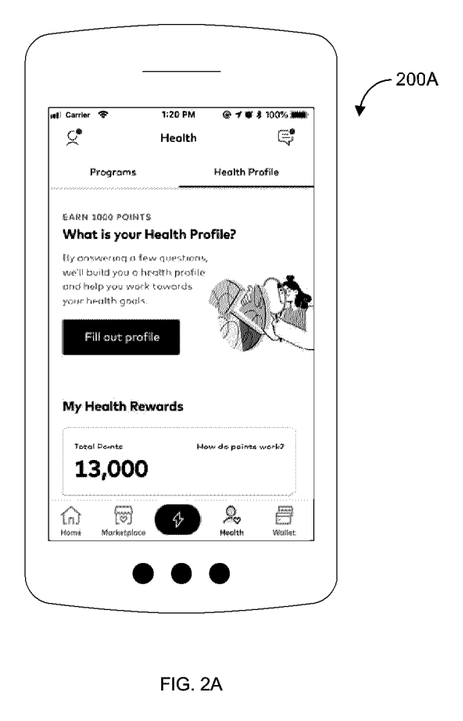
FIGS. 2A, 2B and 2C are representative user interfaces of the content recommendation system of FIG. 1 according to at least one embodiment of the present invention.
Figure 2B:
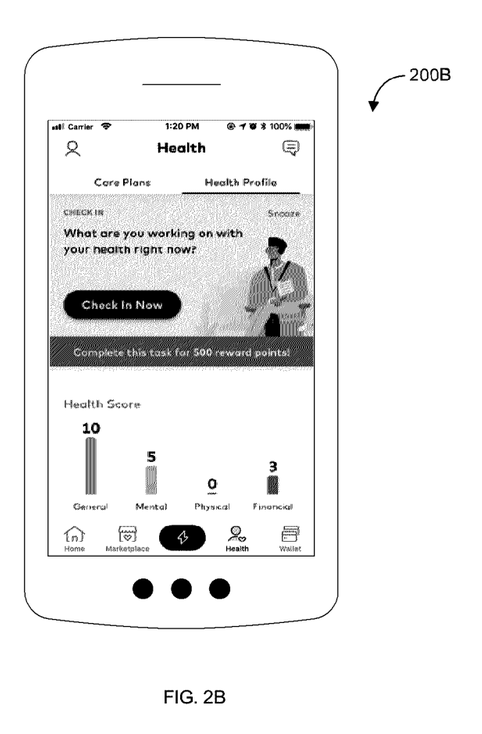

The client app may be used by the user to access the system 100 and available content therein. The user may set up the client app in a number of ways. For example, the user may first proceed to download and install the client app on their client system 180. Upon installation of the client app, the user can set up his or her health profile and enroll with the system 100 with his or her own account. In some cases, the employer may set up a new account for a new employee and the employee may complete enrollment via the client app with the relevant account information. For example, on first initialization of the client app, the user may be presented with an interface screen 200A as shown in FIG. 2A asking the user to fill out a health profile. Subsequently, the user may be prompted to add additional information to the profile, such as in the example interface screen 200B of FIG. 2B. In this example, the user is presented with a question to provide a health "check in" to update their health profile. In both instances, incentives such as reward points can be given to the user for carrying out the task. The reward points can be used later to obtain goods and services.

The user's health profile associated with their account may initially be sparsely populated using information available to the employer such as the individual's name, address, date of birth, etc. The user may then use the client app to provide additional information to complete or more extensively fill out their health profile. The information collected by the system 100 via the client app may be in the form of a health assessment comprising a list of questions for the user to complete. These questions may relate to the user's general health, medical/health history, current medications, health and wellness goals (e.g. to lose a certain amount of weight, to train for a marathon, etc.), health/lifestyle interests, and health data (e.g. weight, height, existing medical conditions), and the like. The client app may also be integrated with various telemetric devices and platforms capable of measuring other biological indicators such as those sold under the trademarks AppleWatch™, FitBit™, Google™ Fit™, and Apple™ Health. The data captured by these devices can include temperature, blood pressure, and heart rate that can be provided to the client app to populate the user's health profile.

The health profile, along with the various health benefits available (e.g., health programs, marketplace items), are assigned a suitable identifier and one or more tags. For example, tags can be manually assigned in some cases or extracted automatically through keyword analysis or other document processing techniques. Tags can be used to categorize the interests of a user (if used to tag a health profile) and the nature of the health benefit (if used to tag a health program, marketplace item or other content). For example, tags entitled "lifestyle", "fitness", "wellness", "mental health", and "prevention" etc. can be used.

The words used in the tags applied to either the health profile or to the health programs, marketplace items or other content may in some cases be selected from a common dictionary of words that comply with an established taxonomy (i.e. a "universal taxonomy") that is recognized throughout the system 100. In some embodiments, tags containing words that do not initially belong to the universal taxonomy may be processed using techniques described herein in order to generate semantically equivalent tags containing only words that do belong. The taxonomy defined in the common dictionary may be updated from time to time or as required to include additional words or deprecate obsolete words that are no longer used or required. As explained further herein, use of a universal taxonomy can improve the functionality and utility of system 100 by enabling the recommendation engine 160 to use natural language processing and other machine learning techniques when identifying and recommending health-related content to individual users.

The tags associated with each content item may be added, updated, or removed by an administrator of the system 100 or managed automatically based on descriptive information about the content. Each content item would therefore be associated with one or more tags from the universal taxonomy. The new tags can be added to update the taxonomy as new products, items and programs are introduced.

In some embodiments, in addition to or as an alternative to the health assessment, the user may authorize the system to access external databases managed by third-party data providers to obtain health related information. For example, the user may authorize the system 100 to contact the user's pharmacist to obtain a list of medications the user is currently taking or has taken. The type of medication taken by the user may inform the system 100 of the user's health status (i.e. existing medical conditions) and/or allow the system 100 to infer possible health-related risk factors associated with that user.

Figure 2C:
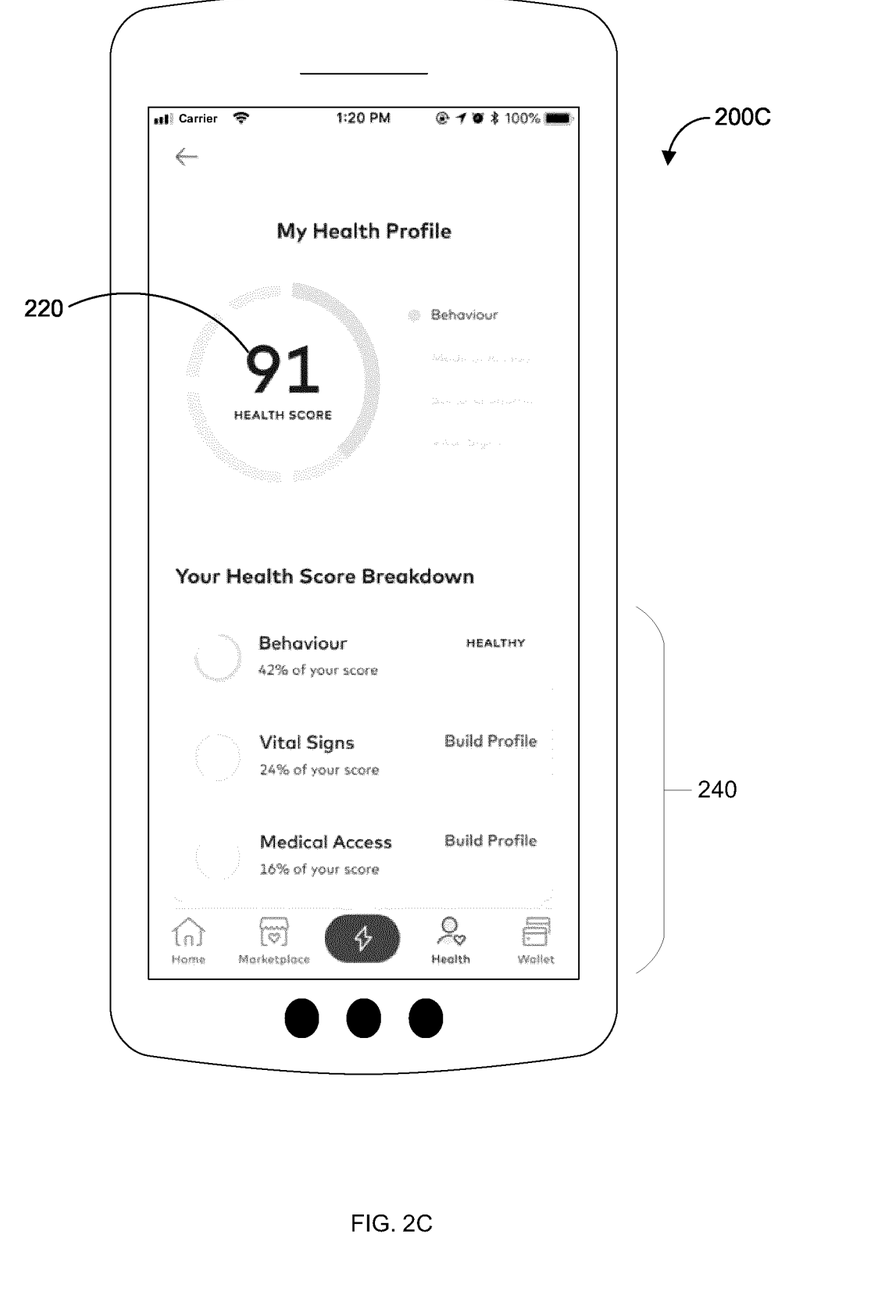

The health profile, once completed or filled out, can contain one or more of the following elements including, but not limited to, risk factors per medical condition, assigned tags (using the universal taxonomy), user preferences, and responses to the health assessment questions. The health profile therefore functions as a representation of the user's overall health at various time points and can be used as the central point of reference for the user to view and track their progress towards a health goal. In some cases, the various pieces of information used to compile the health profile may be used to generate a health profile score. FIG. 2C depicts an example of such a health profile 200C and corresponding health profile score 220 provided on the user app operated on a mobile phone. The score 220 can be broken down to its various components 240 comprising score data related to behavioural information, vital signs (e.g. readings taken from telemetric devices), and medical information (e.g. accessible by connecting the client application to a medical records database).

The health profile 200 is updatable using various methods, including, but not limited to, the user's interaction with the platform, periodic check-ins with the user, activity tracking via client app and telemetric device integration, and data from external or third party partners.

The application server 120 can combine the data within the health profile with other user-specific metadata such as benefit usage, custom client data and third party datasets. Corresponding tags from the universal taxonomy can be selected for association with the profile. The combination of this data can be used as input to the recommendation engine 160 to identify additional health programs, marketplace items and/or other content that matches the user's health profile. These recommendations can make the user's experience on the platform more personalized. The recommendations can be generated in real-time based on the user's most recent activities and be presented within the client app.

Recommendation Engine

In different embodiments, the application server 120 is configured to assemble and provide content items and other information for input to the recommendation engine 160. However, it is also possible that the input can be generated by the client app running on a client system 180. In some embodiments, the input information can include the user's health profile, health program items and marketplace items and other health solutions provided by the employer and/or previously selected by the user, and identifiers and tags associated with the foregoing. The information is assembled and formatted as an item table or any other suitable formats such as XML and JSON data object. The output generated by the recommendation engine 160 can take the form of a similar item table or other suitable data object that contains item identifiers of the recommended items (e.g. health programs, marketplace items, or both) and may further include additional logic that would enable the application server or other component in the system 100 to rank, order, and/or filter the recommended items by selected or specified criteria such as expected clinical impact and/or return on investment for display to the user in the client app as discussed above.

The recommendation engine 160 can be configured to perform content-based recommendations in some cases by first determining a user's interests and then identifying health program items, marketplace items, and other content that are determined to match or best match those interests. By tagging all content available to the user under a universal taxonomy, recommendation engine 160 can effectively apply natural language processing ("NLP") techniques and NLP models to the available health content items in order to generate the recommendation(s) for the user.

As will be described in greater detail below, the recommendation engine 160 can first be initialized by generating a suitable similarity index (the "content index") that provides a numerical representation of each content item in system 100 that enables recommendation engine 160 to compute a measure of the degree to which each content item matches or aligns with the user's health interests characterized based on his or her health profile or other sources. In some implementations, the content index can be generated based on a vectorized item corpus built using the available content items and their respective tags (referenced to the universal taxonomy). Then, during operation of the system 100, the recommendation engine 160 can be queried in order to generate recommended items for the user using the content matrix and a compatible numerical representation of user interests in order to compute a measure of similarity. The content index used by the recommendation engine 160 can be updated periodically or from time to time as new items and associated tags are introduced to the system 100. In some embodiments, the content index could be generated or regenerated each time the recommendation engine 160 is requested to provide recommended content to a user, instead of being initialized in advance, depending on use-case requirements. In such an embodiment, a new content index can be generated for each recommendation provided by the recommendation engine 160, using the approaches described herein.

Figure 3:
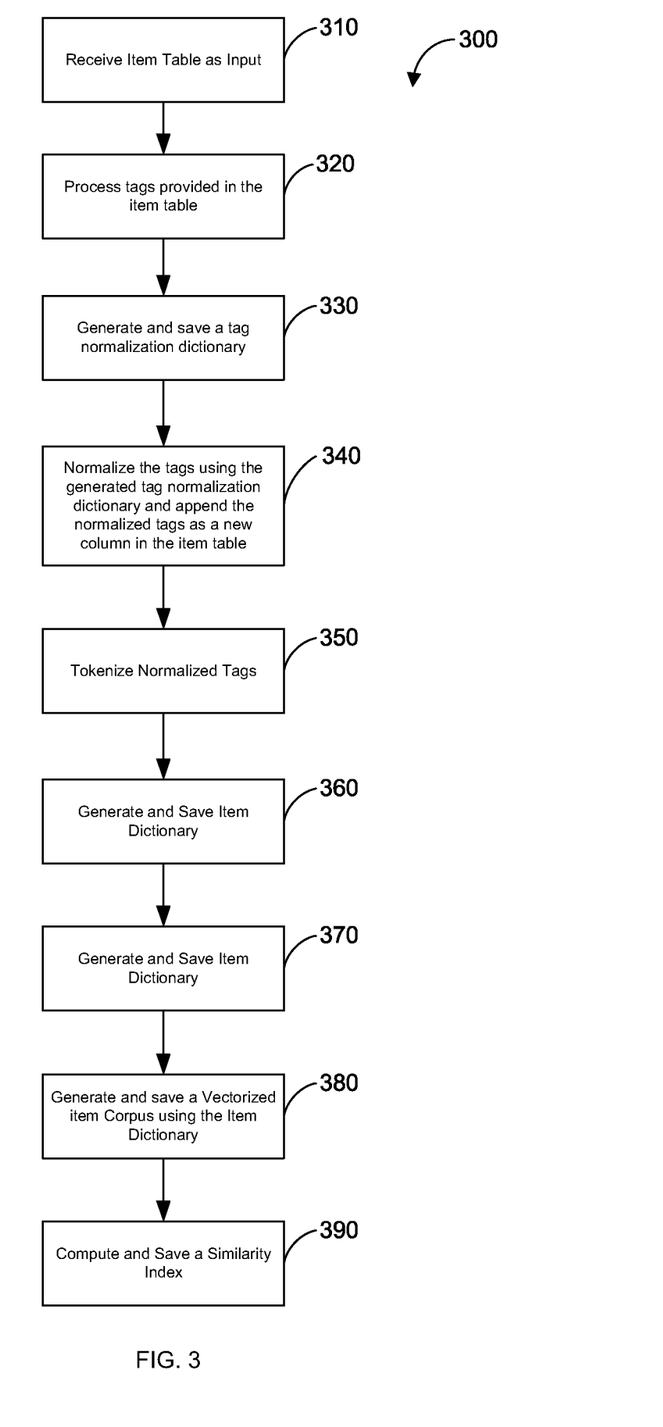
FIG. 3 is a flow chart of a process for initializing the content recommendation system of FIG. 1 according to at least one embodiment of the present invention.

Referring now to FIG. 3, shown therein is a process 300 for initializing the system 100 to enable the generation of content-based recommendations. This initialization procedure may be utilized within system 100 to compute and store a content index as described herein by applying NLP techniques to an item table containing data related to the different content items available within system 100. Process 300 may be performed, for example, on a first run of the system 100, in which any one or more of a suitable common dictionary of words, a vectorized item corpus, and a content index do not yet exist. The system 100 is initialized in accordance with the following steps as set out in FIG. 3 and described in more detail in the subsequent paragraphs.

At process step 310, an item table containing a complete list of items offered to users (e.g. health program items, marketplace items, or other content), including corresponding tags and item IDs for each respective item, is compiled and provided as input to the system 100 for initialization. For example, the application server 120, recommendation engine 160 or even an external data processor may be configured to receive and process this information.

At process step 320, the tags corresponding to each content item in the item table are extracted and are added to a tag normalization dictionary that is created and saved at process step 330. Extracted tags may be a single word or a longer phrase comprised of multiple different words. In some cases, one or more tags added to the tag normalization dictionary may comprise words or phrases that while not identical, may be synonymous or otherwise semantically close to one another in meaning. Accordingly, at process step 340, the tags included in the dictionary may be normalized by organizing each such semantically related tag into a common grouping and mapping each semantically similar or equivalent word or phrase in a given grouping into a single canonical representative word or phrase. Such normalization can be, for example, morphological, syntactical, or lexico-semantical. For example, tags for "low calorie diet" and "weight loss" could, in process step 340, form a semantically related grouping of tags that are mapped to a common phrase, which could be either of the original phrases or a different synonymous phrase that is selected as the canonical form.

At process step 350, the normalized tags are then tokenized by segmenting and dividing each respective tag into smaller semantic units. For example, tags may be tokenized according to one or more different natural language delimiters, such as spaces, hyphens, or other punctuation. In some cases, normalized tags may be tokenized into individual constituent words, but in other embodiments, hyphenated or compound words or regular expressions may alternatively or additionally be used. At process step 360, the tokenized normalized tags are added to a common vocabulary or dictionary of M tokenized words or phrases.

At process step 380, a vectorized item corpus in the form of an N×M matrix can be generated from the N content items extracted from the item table in process step 310 and the common vocabulary of M tokenized words generated in process step 360. The vectorized item corpus can be generated using natural language processing (NLP) techniques, including but not limited to, the bag of words method, term frequency-inverse document frequency (TF-IDF) method, latent semantic indexing (LSI) method, or any other suitable method.

In one exemplary embodiment, for example, a vectorized item corpus can be generated using the bag of words method as an N×M matrix, in which the N rows correspond to the N content items extracted from the item table (representing the total count of content items available in the system 100) and the M columns corresponds to the M tokenized words (representing the count of common "vocabulary" words). Each of the N items in the item table is assigned a corresponding row and each of the M tokenized words in the vocabulary is assigned a corresponding column in the N×M matrix of the vectorized item corpus. For each column at a given row corresponding to an item, in some embodiments, a binary value can be assigned to indicate whether that item contains or otherwise is associated with a certain particular word token in the vocabulary, with a "0" and "1" indicating "no" and "yes", respectively. In another example embodiment, the value of each matrix entry may be an integer count of how many times a particular word token appears in the associated tags for a corresponding content item.

In another example embodiment, the vectorized item corpus may instead be generated using the TF-IDF method in which each element of the N×M matrix is a non-binary, real-valued numerical value that represents the occurrence of each tokenized word in the corresponding tags of a content item adjusted by the size of the content item set and the frequency with which each give word token appears. Utilization of the TF-IDF method over other NLP techniques in generating the vectorized item corpus may illustratively allow the recommendation engine 160 to identify the number of unique words versus words and the frequency of their use.

The vectorized item corpus is then indexed, at step 390, by processing the compiled item table to generate index values for each element of the output N×M matrix according to one of the NLP technique as described herein, such as the bag of words or TD-IDF methods. Once indexed, the index vectorized item corpus (or content index) enables user input queries to be received and processed by the recommendation engine 160 in order to generate recommendations for the user. The indexed vectorized item corpus can be regarded as a "similarity index". This similarity index can, in some cases, allow quick access and retrieval of the items stored therein. This similarity index can be generated by computing similarities across elements within the corpus.

For example, the content index can subsequently be queried by the recommendation engine 160 by accepting, in some embodiments, a first set of item tags from the user as input (e.g. tags associated with the user's health profile, and health programs and/or marketplace items that the user has engaged with in the past). In some embodiments, the first set of item tags may be received by the recommendation engine 160 as a vector of length M that numerically represents the user's interests in terms of the M tokenized words in the common vocabulary as determined from the associated tags in the input query. The recommendation engine 160 may then identify one or more items from the vectorized item corpus whose index values (that were generated based on a corresponding second set of tags associated with the content items available in the system 100) are computed to have a high degree of similarity or correlation with the first set of tags.

The degree of the similarity may be assessed in respect to the semantic relatedness of the words in the first and second set of tags (e.g. semantic similarity) computed or determined, as described in greater detail below, using a numerical measure of similarity such as cosine similarity. The item(s) within the vectorized item corpus which are associated with tags that have a high degree of computed similarity with the input tags can be identified as candidate items for recommendation. The recommendation engine 160, having identified these candidate items, may be able to sort, in decreasing or increasing order, candidate items identified from the vectorized item corpus based on the computed degree of similarity with the input tags. Accordingly, the recommendation engine 160 may be configured to identify one or more items that may be of relevant interest to the user based on computed similarity.

In some embodiments, recommendation engine 160 can be implemented using a suitable indexing tool such as GenSim™ that implements a MatrixSimilarity or equivalent method to computationally measure similarity between the input query and items contained in the vectorized item corpus. This method can compute similarity, for example, based on the cosine similarity between the input query vector of length M and each row in the indexed vectorized item corpus (corresponding to a different item in the item table) also of length M. The output of this operation can thus be a vector of length N that represents a computed similarity between the user's interests and each of the N content items available within system 100 according to a common calculation, such as cosine similarity, which thereby allows for an implicit comparison between the user's interests and each of the N items. Once computed by the recommendation engine 160, the indexed vectorized item corpus or content index can thereby be used subsequently for comparison against different input queries (e.g. inputs corresponding to information related to the user) received by recommendation engine 160, either from the same user or received from different users. Alternatively, in some embodiments, other suitable indexing methods can be utilized including, but not limited to, Hierarchical Navigable Small World graphs ("HNSW") and Approximate Nearest Neighbours Oh Yeah ("ANNOY").

Figure 4:
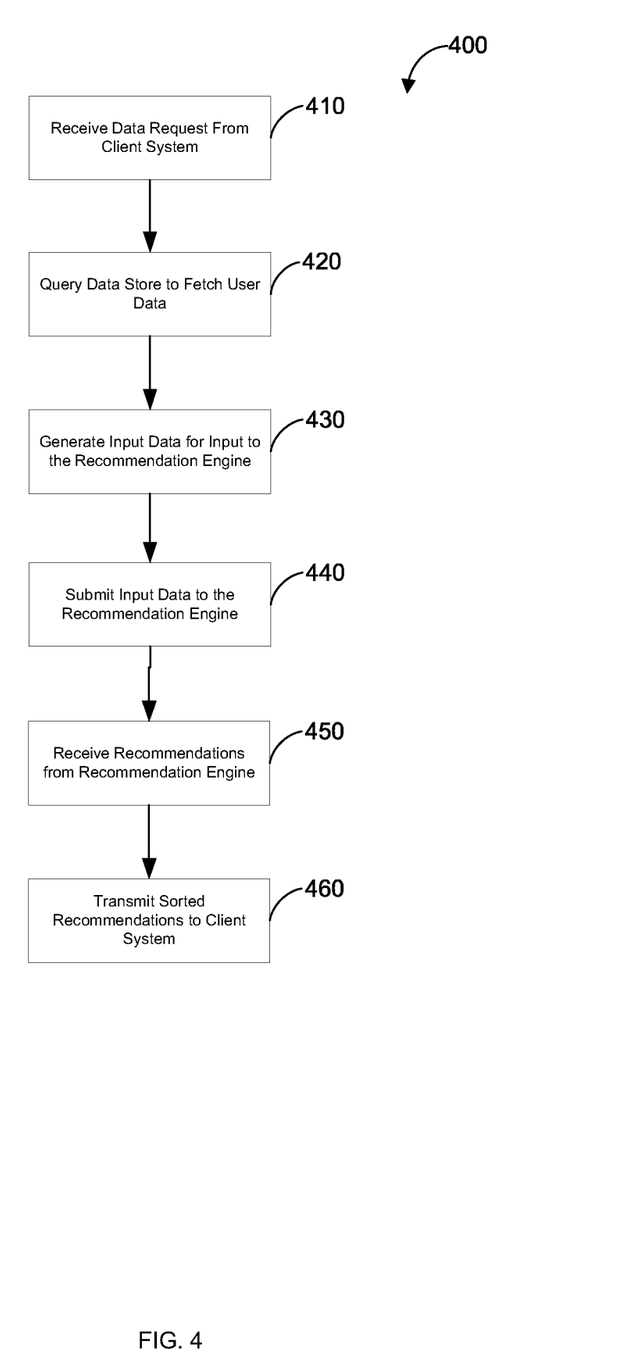
FIG. 4 is a flow chart of a process for generating and submitting a request for recommendations within the content recommendation system of FIG. 1 according to at least one embodiment of the present invention.

Following initialization of the system using the method 300 of FIG. 3, queries may be sent to the recommendation engine 160 to generate content recommendations for users. During use, for example, in response to user queries received at the communication interface or layer from client systems 180, the application server 120 can contact the recommendation engine 160 on behalf of the client systems 180 to obtain recommendations based on the current state of the content index. FIG. 4 is a flow chart of process 400 outlining an example procedure for generating and submitting a request for recommendations to the recommendation engine 160 within the system 100a.

Figure 7:
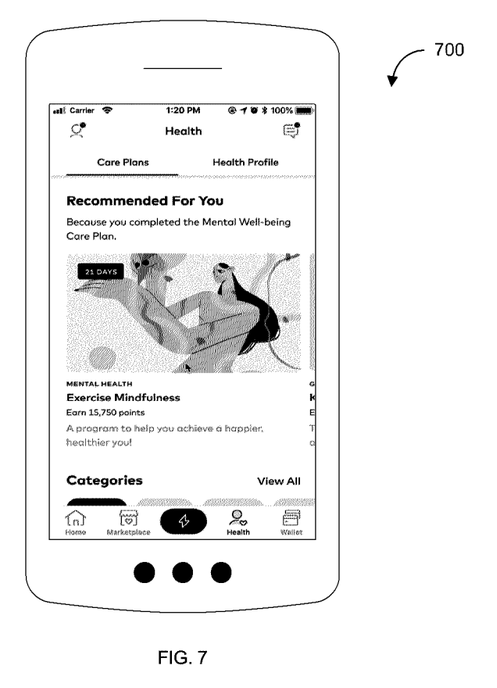
FIG. 7 is a representative user interface displaying user recommendations according to at least one embodiment of the present invention.

At step 410, the communication interface of the application server 120 receives a request for content recommendation from a client system 180. This request, for example, may be generated and transmitted by the client app on client system 180. At step 420, upon receiving the request at the communication interface, the application server 120 may query the data warehouse 140 to fetch information about the user at step 420. At step 430, the fetched data is used to generate input data for the recommendation engine 160. For example, the fetched data can be retrieved as an item table containing various information about the user including one or more associated tags. The input data is submitted, at step 440, to the recommendation engine 160 for processing in a form that is mathematically or computationally relatable to the content index by a similarity measure such as a cosine similarity. For example, as described herein, the input item table retrieved from the data warehouse 140 may be transformed by the recommendation engine 160 into a vector of length M corresponding to the incidence of the associated user tags in the common vocabulary. Content recommendations are subsequently generated by the recommendation engine 160 as described herein and returned to the application server 120, at step 450, from the recommendation engine 160. The recommended content is transmitted to the client system 180 at step 460. In some cases, the recommended content generated by the recommendation engine 160 using methods described herein is relatively small in data size. The transmitted recommended content can be efficiently stored, either temporarily or permanently, on client device 180 and subsequently formatted and/or displayed to the user as shown in interface display 700 of FIG. 7.

Figure 5:
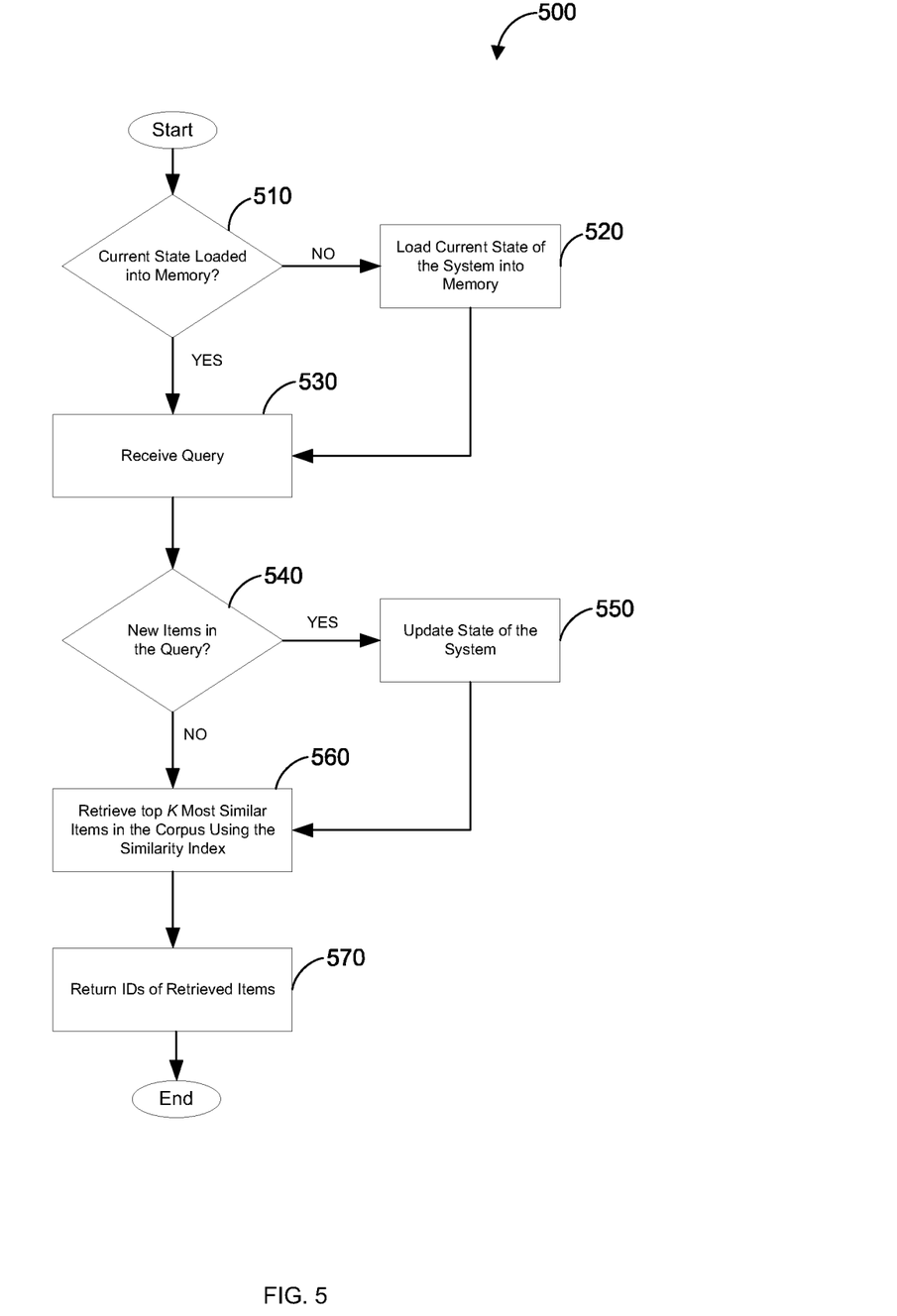
FIG. 5 is a flow chart of a process for processing an input query for retrieving recommendations according to at least one embodiment of the present invention.

FIG. 5 is a flow chart of process 500 for processing input query data by the recommendation engine 160. At decision step 510, the recommendation engine first checks if the current content index (the "current state") is loaded into memory. If the current state of the content index is not in memory (i.e. "NO" at decision step 510), the process moves to step 520 in which the current state is retrieved from the data warehouse 140 and loaded into memory before proceeding to process step 530. If the current state is already loaded into memory (i.e. "YES" at decision step 510), the process moves directly to step 530.

At step 530, the recommendation engine 160 receives a recommendation query, for example, from the application server 120, in the form of an item table containing information about the user and the user's past/historical interactions with the system 100. The information can include the user's health profile and associated tags, as well as marketplace item IDs and health program IDs that the user has previously selected. At decision step 540, if new items are encountered in the query (i.e. items that do not appear in the current state of the content index) then the process moves to step 550 (i.e. "YES" at decision step 550) to update the state of the content index, as described in greater detail below with respect to process 600 of FIG. 6. After the system is updated, the process then moves to step 560. If there are no new items identified in the query (i.e. "NO" at decision step 540), then the process moves directly to step 560.

At step 560, the tags associated with the user's health profile and previously selected items can be extracted from the input query and formatted, for example, into a vector of length M (corresponding to the M tokenized words in the common vocabulary). Each component of the vector may be a numerical quantity or representation, such as a word count or weighted score, corresponding to or derived from the associated tags with that particular recommendation query. The query vector may be used as input to the content index to identify and retrieve the K most similar items in the vectorized item corpus based on the computed similarity, such as cosine similarly, between their respective tags and recorded in the output vector of length N. The tags can form a set of words or word tokens from the common vocabulary of tokenized words so as to allow the recommendation engine 160 to identify items from the index processor based on computed similarity values against corresponding sets of tags defined for the various items in the content delivery system 100. The value of K may be predefined, as set by an administrator for one or more users, or defined by the user as a user preference. Since the vectorized item corpus is a structured representation of health programs, marketplace items, and other health benefits on the system that are available to the user, the K most similar items identified from the vectorized item corpus represent items that are determined to match or most closely match to the interests of the user. In other words, the identified K most similar items can be regarded as items recommended to the user that made the recommendation request.

At step 570, the recommendation engine 160 returns the item identifiers or IDs of the recommended items as output along with any associated logic. The generated recommendation may be provided by the recommendation engine 160 back to the application server 120. The associated logic can be used to indicate how to filter and sort the returned IDs as previously described so as to enable the recommendations to be displayed to the user in, for example, a ranked order (e.g. listing items that are most similar first in an order of decreasing similarity) or in any other desired manner (e.g. by geography, popularity, etc.).

In some embodiments, ordering can be based on secondary parameters. For example, if two equally relevant recommendations are identified, the ranking of these recommendations can be based on factors other than determined similarity to user interests, such as the accessibility of a given recommendation to the user, for instance in terms of its proximity to the user's physical location or address. In some embodiments, the recommended item that is closer in geographic proximity to the user's current location can be ranked higher than another equivalently recommended item that is further away.

In some embodiments, predetermined sorting and filtering rules can be used to filter employer sponsored health programs. These rules can be developed using an evidence-based recommendation approach that ranks health programming based on the level of evidence and expected clinical and economic outcomes. These rules are based on data inputted for each employer's sponsored health program and stored in a rules registry 142 within the data warehouse 140, or dynamically selected for the specific query by the recommendation engine 160.

In other cases, customized filtering rules can be specified based on sorting and filtering preferences provided by the user. In yet other embodiments, sorting and filtering rules can be applied to filter for potentially sensitive information that the user has disclosed. For example, if a user has indicated that they require a wheelchair for mobility, then the recommendation engine 160 would exclude fitness-related items that cannot be performed with a wheelchair.

In some embodiments, the filtering is performed to flag or discard items returned by the recommendation engine 160 that the user had previously selected or been delivered (i.e. "historical filtering"). For example, if the recommendations from the recommendation engine 160 include one or more health programs that the user has previously taken, these programs may be prevented from being displayed. In such configurations, the recommendation engine 160 may withhold such item IDs from being provided to the client app of the client system 180 for display. In other embodiments, previously selected or delivered items may still be displayed to the user, but are displayed alongside a suitable symbol or indicator indicating that the user has already selected or been delivered that item. Whether or not to flag or filter out an item for display may in some embodiments be determined by the user or system administrator based on a desired time threshold. For example, if the amount of time that has elapsed since the user's selection or delivery of that item exceeds a specified amount of time (e.g., 6 months, 12 months, etc.), that program may be displayed rather than withheld or displayed without being flagged as an old item or even though the user has in fact selected or been delivered that item in the past.

In another embodiment, the filtering process can further include filtering based on geographical parameters (i.e. "geographical filtering"). For example, marketplace items (e.g. products and services) may be tagged with geographic descriptions indicating the locations where these marketplace items may be obtained. By applying geographic tags, the recommendation engine 160 may filter results delivered to the user by location so that marketplace items available in the same geographic area as the user's current geographic area are displayed exclusively or in some cases prioritized to other marketplace items in other geographic areas. For example, if it is determined that the user is located in New York City, then recommended marketplace items with geographic descriptions for Boston may be filtered out. This can reduce the amount of superfluous data delivered to client devices 180. The size of the geographical region used for filtering can be adjusted in different ways to suit the preferences of the user. For example, a user may choose to seek out items available within a 2 Km radius in one instance. In other situations, the user may define the geographical region based on districts within a city. For instance, a user can set the geographical region to the borough of Queens in New York City so that items with geographic descriptions for the borough of Staten Island in New York City would be excluded for display.

In yet another embodiment, customized filtering rules relating to health insurance or benefits coverage can be implemented by recommendation engine 160. For example, filtering can be further carried out in respect of whether a health program or marketplace item is within the scope of coverage of the user's particular health benefits plan. Such filtering may be desirable where the user's benefits provider may prefer not to have "out-of-coverage" items to be shown to users of its benefits program. For example, items that are not covered by the plan can be filtered out even if they are not excluded by historical filtering or geographical filtering. The customization of filters and combination of filters can be modified/updated as needed to reflect changes in the benefits plan and coverage. The customization of filters and/or combination of filters can also help reduce the amount of superfluous data delivered to client devices 180.

In the present embodiment, the application server 120 can perform the above-described exemplary filtering tasks. However, these tasks can alternatively be performed by the recommendation engine 160 or another component of the system 100 so that the recommended items presented to the user meet the various display preferences of the user and/or the benefits provider. In other implementations, the filtering may be performed at the client system 180 by the client app. In yet other implementations, the filtering tasks can be divided up between the two or more system components such as the recommendation engine 160, application server 120 and/or the client app. For instance, geographical filtering can be performed by the application server 120 while historical filtering is performed by the recommendation engine 160 (or vice versa). Dividing the filtering tasks in such a manner can, in some cases, reduce the computational load on the application server 120 and/or recommendation engine 160.

Sorting of recommendations can in some embodiments be performed based on a closest neighbour analysis for item IDs having tags with the closest match. For example, the user receiving the recommendations may have previously selected one or more health programs related to running (i.e. the program is tagged using tags that indicate a relevance to running). Based on this information, the recommendation engine 160 may apply sorting rules to the recommended content returned to the user based on a new input query so that the output sorting rules rank health programs and products related to running that were returned to a higher position in the results display (e.g. items such as running shoes and heart monitoring devices) than other items returned by the recommendation engine 160 that are not related to running. In addition, in some embodiments, recommendations can be sorted based on expected clinical impact and/or health economic benefit for an individual's selected or determined health risk. For example, a formula for determining these impacts or benefits can be based on a rank ordering approach that takes into account the level of clinical evidence for each recommended solution and rank of the published economic evidence summarized using a return on investment value.

In other implementations, items selected by the recommendation engine 160 or filtered for display may further take into account the item's ratings or significance. For example, if a particular employer or benefits plan provider wishes that all of their employees or plan members be aware of a certain program item or marketplace item, a higher rating can be assigned by the recommendation engine 160 to that item by way of a rating parameter. The recommendation engine 160 can be further configured to recognize the rating parameter as it locates suitable items for the user. Items that all users should see can be designated with a higher rating or a special designator so that such items would always appear as a recommendation, even if they were not necessarily the most similar in terms of similarity. In other cases, certain items may be tagged as a "priority" or "promoted"

item so that they always form a part of a user's recommendations. Such implementations can, in some cases, improve the overall computational efficiency of system 100.

Figure 6:
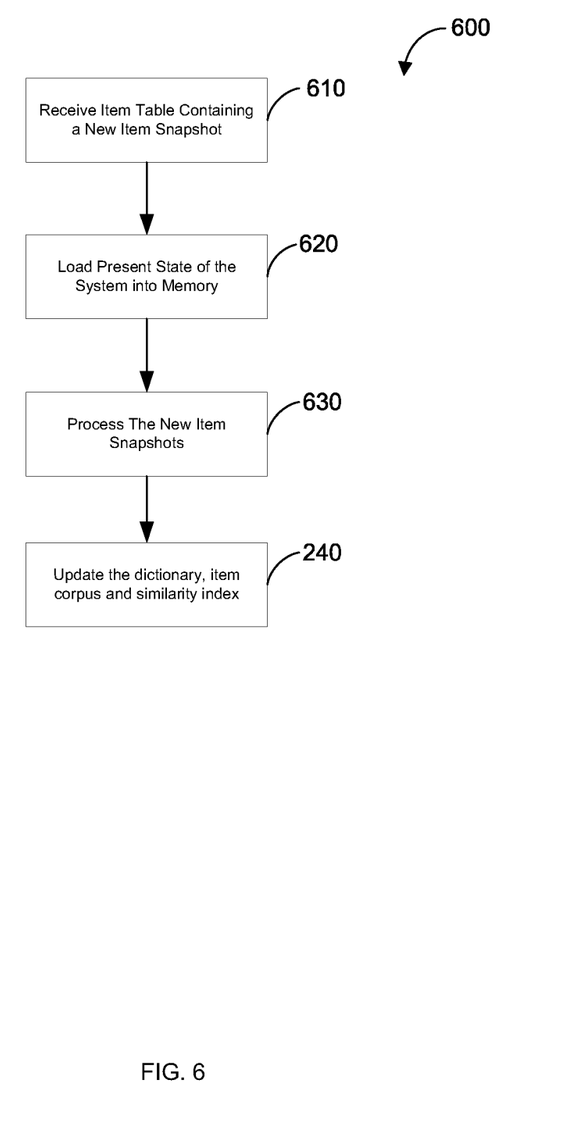
FIG. 6 is a flow chart of a process for updating the content recommendation system of FIG. 1 according to at least one embodiment of the present invention.

When new content items such as new health programs and marketplace items are introduced, these new programs and items can be added to the recommendation system by way of a system update. This update enables the recommendation engine 160 to identify and begin outputting these items as recommendations to users. FIG. 6 is a flow chart of process 600 that can be performed to add one or more new items to the system 100. This procedure can be regarded as a "recommendation system update" or simply "system update". At step 610, the recommendation engine 160 receives a query with an item table containing one or more new item snapshots as inputs. These items may be recognized as new items as there are no corresponding entries in the vectorized item corpus. At step 620, the present state of the system is loaded into memory, namely, the current vectorized item corpus, item dictionary, and the content index.

At step 630, the new item snapshots are processed for incorporation into the system 100. The process can follow the method disclosed above in respect of system initialization in FIG. 3.

At step 640, the present item dictionary, vectorized item corpus and the content index of the recommendation system are updated as follows:
 a. Update and save the vectorized item corpus of the recommendation system using the updated item dictionary; and
 b. Update and save the content index of the recommendation system.

The update of the content index can be accomplished by regenerating the content index using the updated vectorized item corpus.

The examples and corresponding diagrams used herein are for illustrative purposes only. Different configurations and terminology can be used without departing from the principles expressed herein.

Although the invention has been described with reference to certain specific embodiments, various modifications thereof will be apparent to those skilled in the art without departing from the scope of the invention. The scope of the claims should not be limited by the illustrative embodiments set forth in the examples, but should be given the broadest interpretation consistent with the description as a whole.

The invention claimed is:

1. A computer-implemented method of selecting content items from a collection of content items in a content delivery system, the method comprising:
 at an application server, initializing the content delivery system by
  tagging each of the content items in the collection of content items using a common taxonomy of tokenized content item tags;
  generating a vectorized item corpus corresponding to the collection of content items and the common taxonomy; and
  indexing the vectorized item corpus to generate a computationally-efficient content index of the collection of content items;
 loading a current state of the content index into memory; and
 in response to a recommendation query from a user of the content delivery system, generating content recommendations for the user based on the current state of the content index loaded into the memory by:
  receiving a user profile associated with the user, the user profile containing user information identifying at least one characteristic of the user;
  receiving a user history associated with the user, the user history identifying at least one previously selected content item selected from the collection of content items by the user;
  extracting a first set of tags from the user profile and the user history, the first set of tags containing at least one tag associated with the at least one characteristic of the user and the at least one previously selected content item selected by the user;
  generating a content list containing a selection of content items from the collection determined to be of potential interest to the user by querying the content index using the first set of tags as an input, identifying a second set of tags that are computed based on the query to be semantically similar to the first set of tags, and selecting the content items associated with the second set of tags for inclusion in the content list; and
  outputting the selection of content items to the user as an ordered list according to potential interest to the user;
 wherein the vectorized item corpus is a two-dimensional matrix with a first dimension having a first size corresponding to a total count of items in the collection of content items and a second dimension of a second size corresponding to a total count of tokenized content item tags, and each tag in the first set of tags and the second set of tags belong to the common taxonomy used for the tokenized content item tags.

2. The method of claim 1, comprising outputting the selection of content items to the user as an ordered list according to a computed degree of similarity between the selected content items and the user profile and the user history.

3. The method of claim 1, wherein the user profile and user history are provided in an item table associated with the user.

4. The method of claim 3, further comprising, in response to the recommendation query, determining that the item table contains at least one new item that is not recorded in the current state of the content index, updating the content index loaded into the memory to include the at least one new item, and generating the content recommendation based on the updated state of the content index.

5. The method of claim 1, wherein the content list is computed based on cosine similarity between the content index and the first set of tags.

6. The method of claim 1, wherein the vectorized item corpus is generated by:
 generating a tag normalization dictionary based on at least one content item tag associated with the collection of content items;
 normalizing each of the at least one content item tag to produce at least one normalized content item tag;
 tokenizing each of the at least one normalized content item tag to produce at least one tokenized content item tag;
 generating an item dictionary based on the at least one tokenized content item tag; and
 associating each content item in the collection of content items with at least one tokenized content item tag in the item dictionary.

7. The method of claim 6, wherein the step of associating comprises using a natural language processing method that provides a numerical representation of the relative incidence of each at least one tokenized content item tag in each corresponding content item.

8. The method of claim 7, wherein the natural language processing method comprises at least one of: bag of words method, term frequency-inverse document frequency method, and latent semantic indexing method.

9. The method of claim 1, wherein the content index is queried by transforming the first set of tags into a computationally relatable vector.

10. A system for selecting content items from a collection of content items in a content delivery system, the system comprising:
- a data warehouse for storing the collection of content items and a content index of the collection of the content items;
- a communication interface for receiving a plurality of selection requests from a plurality of user client systems; and
- at least one processor operable to process a selection request of the plurality of selection requests to:
  - initialize the content delivery system by
    - tagging each of the content items in the collection of content items using a common taxonomy of tokenized content item tags;
    - generating a vectorized item corpus corresponding to the collection of content items and the common taxonomy; and
    - indexing the vectorized item corpus to generate a computationally-efficient content index of the collection of content items;
  - load a current state of the content index into memory; and
  - in response to a selection request received from one of the plurality of user client systems, generate content recommendations for a user of the content delivery system based on the current state of the content index loaded into the memory by:
    - receiving, from the selection request, a user profile associated with the user, the user profile containing user information identifying at least one characteristic of the user;
    - receiving, from the selection request, a user history associated with the user, the user history identifying at least one previously selected content item selected from the collection of content items by the user;
    - extracting a first set of tags from the user profile and the user history, the first set of tags containing at least one tag associated with the at least one characteristic of the user and the at least one previously selected content item selected by the user;
    - generating a content list containing a selection of content items from the collection determined to be of potential interest to the user by querying the content index using the first set of tags as an input, identifying a second set of tags that are computed based on the query to be semantically similar to the first set of tags, and selecting the content items associated with the second set of tags for inclusion in the content list; and
    - outputting the selection of content items to the user as an ordered list according to potential interest to the user;
  - wherein the vectorized item corpus is a two-dimensional matrix with a first dimension having a first size corresponding to a total count of items in the collection of content items and a second dimension of a second size corresponding to a total count of tokenized content item tags, and each tag in the first set of tags and the second set of tags belong to the common taxonomy used for the tokenized content item tags.

11. The system of claim 10, wherein the processor is further operable to output the selection of content items to the user as an ordered list according to a computed degree of similarity between the selected content items and the user profile and the user history.

12. The system of claim 10, wherein the user profile and user history are provided in an item table associated with the user.

13. The system of claim 12, wherein the processor is further operable, in response to the selection request, to determine that the item table contains at least one new item that is not recorded in the current state of the content index, update the content index loaded into the memory to include the at least one new item, and generate the content recommendation based on the updated state of the content index.

14. The system of claim 10, wherein the content list is computed based on cosine similarity between the content index and the first set of tags.

15. The system of claim 10, wherein the vectorized item corpus is generated by:
- generating a tag normalization dictionary based on at least one content item tag associated with the collection of content items;
- normalizing each of the at least one content item tag to produce at least one normalized content item tag;
- tokenizing each of the at least one normalized item tag to produce at least one tokenized content item tag;
- generating an item dictionary based on the at least one tokenized content item tag; and
- associating each content item in the collection of content items with at least one tokenized content item tag in the item dictionary.

16. The system of claim 15, wherein the step of associating comprises using natural language processing method that provides a numerical representation of the relative incidence of each at least one tokenized content item tag in each corresponding content item.

17. The system of claim 16, wherein the natural language processing method comprises at least one of: bag of words method, term frequency-inverse document frequency method, and latent semantic indexing method.

18. The system of claim 10, wherein the processor is further operable to query the content index by transforming the first set of tags into a computationally relatable vector.

* * * * *